United States Patent
Kristensen

(10) Patent No.: US 8,127,633 B2
(45) Date of Patent: Mar. 6, 2012

(54) LINEAR ACTUATOR

(75) Inventor: Henning Kristensen, Sydals (DK)

(73) Assignee: Linak A/S, Nordborg (DK)

( * ) Notice: Subject to any disclaimer, the term of this patent is extended or adjusted under 35 U.S.C. 154(b) by 692 days.

(21) Appl. No.: 12/225,800

(22) PCT Filed: Mar. 30, 2007

(86) PCT No.: PCT/DK2007/000158
§ 371 (c)(1),
(2), (4) Date: Sep. 30, 2008

(87) PCT Pub. No.: WO2007/112744
PCT Pub. Date: Oct. 11, 2007

(65) Prior Publication Data
US 2009/0151490 A1    Jun. 18, 2009

(30) Foreign Application Priority Data
Mar. 30, 2006 (DK) .................. 2006 00453

(51) Int. Cl.
F16H 3/06 (2006.01)
F16H 27/02 (2006.01)
F16H 29/02 (2006.01)
F16H 29/20 (2006.01)

(52) U.S. Cl. ..................... 74/89.37; 74/89.23

(58) Field of Classification Search ............... 74/89.23, 74/89.37
See application file for complete search history.

(56) References Cited

U.S. PATENT DOCUMENTS

| 3,258,985 | A |   | 7/1966  | Jordan |
| 3,708,777 | A | * | 1/1973  | Volkheimer ............ 338/183 |
| 4,479,398 | A | * | 10/1984 | Watanabe ............ 74/89.37 |
| 4,593,238 | A | * | 6/1986  | Yamamoto ............ 318/587 |
| 5,075,911 | A | * | 12/1991 | Dewert ............ 5/616 |
| 5,809,833 | A |   | 9/1998  | Newport et al. |
| 5,927,144 | A |   | 7/1999  | Koch |
| 6,956,384 | B1 | * | 10/2005 | Cha et al. ............ 324/691 |
| 7,066,041 | B2 |   | 6/2006  | Nielsen |
| 2008/0271246 | A1 |   | 11/2008 | Nielsen et al. |

FOREIGN PATENT DOCUMENTS

| DE | 3842078    | 7/1989 |
| EP | 0647799    | 4/1995 |
| WO | 2005122841 | 12/2005 |

OTHER PUBLICATIONS

English Abstract of DE3842078, Jul. 1989.

* cited by examiner

*Primary Examiner* — Justin Krause
(74) *Attorney, Agent, or Firm* — Dykema Gossett PLLC

(57) ABSTRACT

By a linear actuator of the type comprising a driven spindle with a spindle nut, the outer positions and possibly also the intermediate positions of the spindle nut can be determined by a specially designed switch construction. This switch comprises an elongated conductor (8*a*), and next to this at least one other short conductor (8*b*), and where a connection element (10) for the spindle nut is equipped with an electric conductive element (9), for creating contact between the two conductors (8*a*, 8*b*). With two short conductors at the end of the elongated conductor end-stop switches for the nut are achieved and with more short conductors between the two end conductors the position of the spindle nut between its outer positions can be determined.

7 Claims, 3 Drawing Sheets

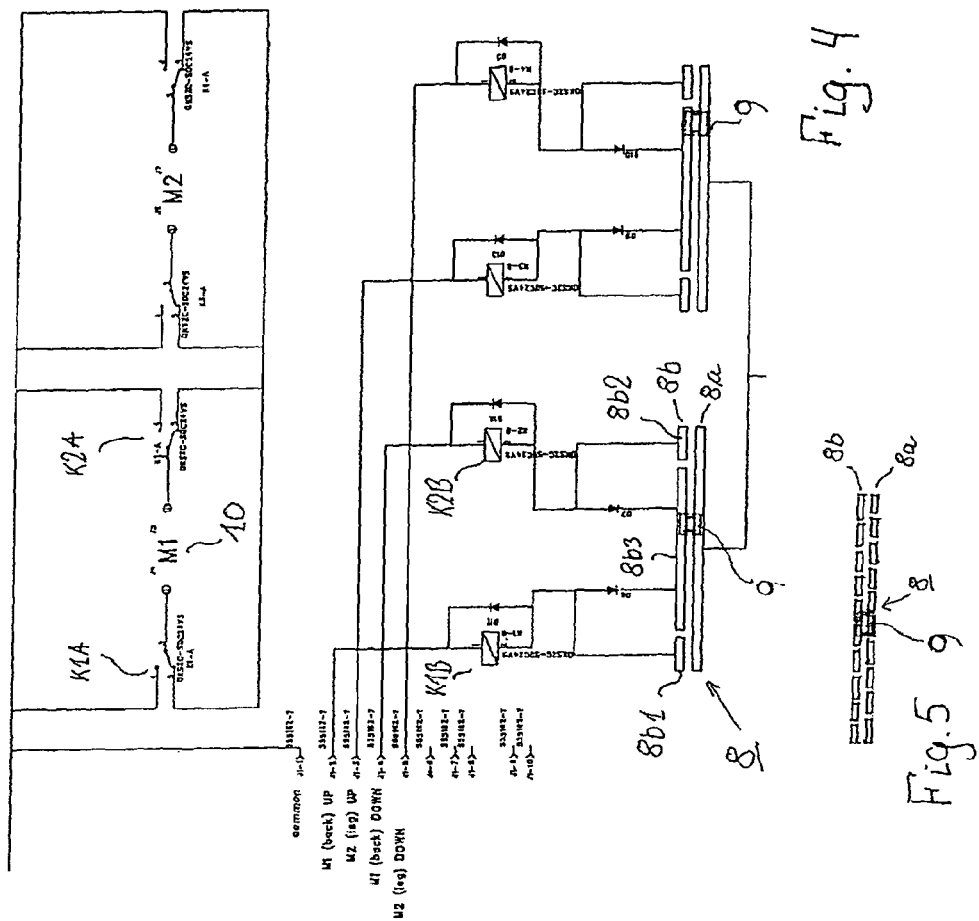

LINEAR ACTUATOR

BACKGROUND OF THE INVENTION

1. Field of the Invention

The present invention relates to a linear actuator wherein an electric motor drives a spindle and the spindle is provided with a spindle nut secured against rotation, which directly, as for example indicated in EP 0 787 267 B1 to Dietmar Koch (OKIN), or which over a tube-shaped actuation rod, as indicated in EP 1 322 876 B1 to LINAK A/S, is connected to an adjustable element for adjusting the same.

2. The Prior Art

The fully extended positions of the spindle nut can be determined in various ways. Typically this can be achieved by means of end-stop switches, which determine the inner and outer position of the spindle nut. As for instance mentioned in EP 1 322 876 B1, this can be brought about with a strip-shaped circuit board equipped with end-stop switches at each end. The circuit board is arranged in parallel to the spindle and in the track of the spindle nut, so that the spindle nut activates the switches in the respective outer positions. This requires a special construction of the guidance or protective tube (also known as outer tube) surrounding the spindle. The circuit board with the switches is connected to the control by wires or cables.

Another construction is mentioned in EP 0 647 799 B1 to LINAK A/S, where the end-stop switches on a circuit board are arranged in the housing of the actuator at the end of the outer tube, the outer tube being embedded in the housing against two springs in a longitudinally movable manner. In the outer positions the spindle nut engages a stop in the guidance tube, which activates the respective end-stop switches.

In the type of actuator first mentioned switches can be placed between the two end-stop switches for detecting intermediate positions. On the face of it, this is not possible by the last mentioned type.

A different way of stopping the spindle nut in the outer positions is by means of mechanical stops combined with a measurement of the electric current consumption. When the nut engages one of the stops, the consumption of electric current will rise considerably, and at a certain predetermined level cut off the current to the motor. The construction has the obvious disadvantage that it is heavy loaded in the outer positions. Here, it is not possible to detect an intermediate position either.

In order to continuously determine the position of the spindle nut, a rotary potentiometer or magnetic or optical encoders connected to the spindle or the transmission may be used. By counting the number of rotations combined with the thread pitch of the spindle, an indication of the position of the spindle nut is achieved. This can also be used for determining the outer positions of the spindle nut. This is of course a more expensive solution than simple end-stop switches. Moreover, the rotary potentiometer has the disadvantage that it can be turned excessively, which causes an incorrect determination of the position. The magnetic and optical encoder has the disadvantage that the position is lost if the spindle begins rotation on its own. When the actuator stops in an intermediate position, it can rotate a little backwards, or it can rotate backwards as a result of failure in the self-locking ability of the actuator, for example by over load or vibrations in the construction. Therefore the position determination is typically combined with end-stop switches.

The purpose of the invention is to provide a more production and logistic-friendly solution, where at the same time it is possible to detect intermediate positions.

SUMMARY OF THE INVENTION

This is achieved according to the invention by constructing the actuator to include end-stop switches mounted on a circuit board with control electronics, and to have the switches activated by an operating element connected to the spindle nut. By mounting the end-stop switches on the circuit board, obvious advantages are obtained as regards the lay-out of the control electronics and assembly of the same. A connection element from the spindle nut to the end-stop switches is of course needed, but this can just be a simple rod-shaped element whose one end is guided on the circuit board.

In a special embodiment the end-stop switches are designed as two parallel pieces of conductors, and where the connection element is equipped with an electric conductive element for creating contact between these conductors placed in pairs in the respective outer positions of the spindle nut. This is a simple, inexpensive and reliable solution. The conductors are, expediently, printed paths on the circuit board.

In a further development at least one other pair of conductors is arranged between these end-stops, at which it is possible to detect an intermediate position. The more intermediate conductor pairs the more intermediate positions can be detected. With a suitable number of intermediate conductors an expression for the position of the spindle nut can be achieved.

Expediently, the conductive element is a roll, which provides for a low wear on the conductors.

With the acknowledgment of the invention, it is possible to step back, at which it is realized that the switch may be constituted by a sliding potentiometer, which also provides possibility for detection of intermediate positions. As an example of sliding potentiometers the RSAON11 Series from ALPS Electric CO., Ltd. can be mentioned. Moreover, it is realized that the switch may be constituted by tactile switches.

For absorbing potential shocks and the like and otherwise protecting the connection element and the circuit board, the connection element can be constructed with a shock-absorbing section. The connection element is expediently made from plastic, and here the shock-absorbing section can be designed as a meander-shaped section.

The connection element is typically longer than the circuit board, for which reason it is, expediently, constructed with hinges, so that it is collapsible, so that it does not project from the ends of the circuit board. In that way, it is ensured that the connection element does not get damaged during the handling and the shipment. The connection element need not be unfolded until the moment that it is to be affixed to the spindle nut.

A special type of linear actuator with a drive in each end is for instance known from DE 38 42 078 C2 to Dietmar Koch, EP 0 372 032 B2 to Eckhart Dewert and WO 2005/122840 A1 to Linak A/S. This type of linear actuator (dual actuator) is used in beds and armchairs for adjusting the back rest and leg rest section, back and seat, respectively. In this type of actuator the circuit board with the control electronics and the switch is placed between the two drives. Only one single switch is necessary for instance one single switch by beds for the drive for the back rest section in case the two sections are arranged to run interdependent of each other, for example that the leg rest section is forcible controlled proportionally to the back rest section. Opportune, a switch is arranged in connection with a drive each, which provides a basis for a simpler controlling and that the sections can be controlled individually. It also provides for enhanced safety, that the section does not exceed its motion path.

An embodiment for the invention will be explained more fully below with reference to the accompanying drawings.

BRIEF DESCRIPTION OF THE DRAWINGS

FIG. 4 shows a diagram of the end-stop,
and
FIG. 5 shows a special split up of the printed electric paths on the circuit board.

DETAILED DESCRIPTION OF THE PREFERRED EMBODIMENT

Figure 1:
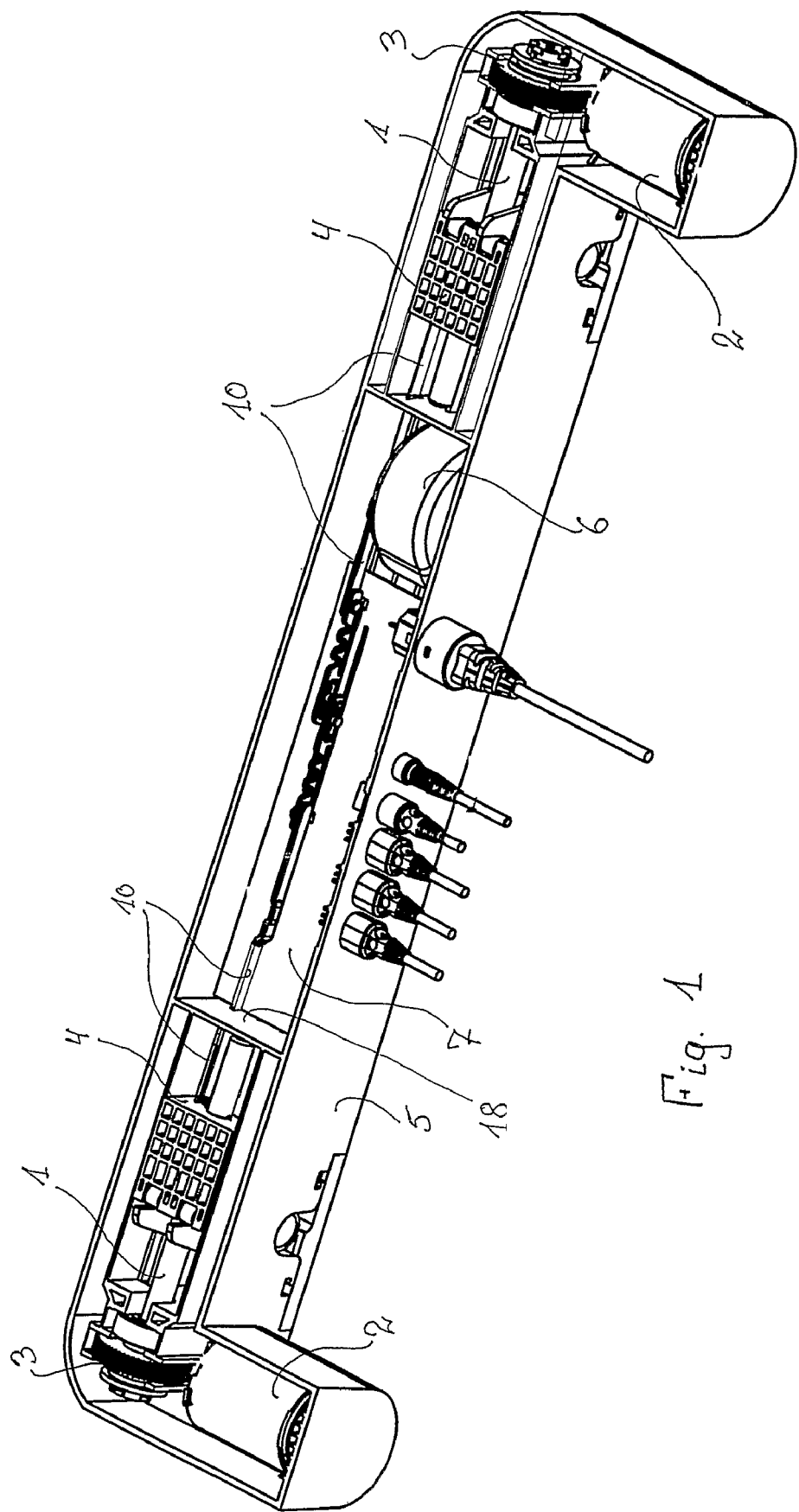
FIG. 1 shows a longitudinal section through a dual actuator.
Figure 2:
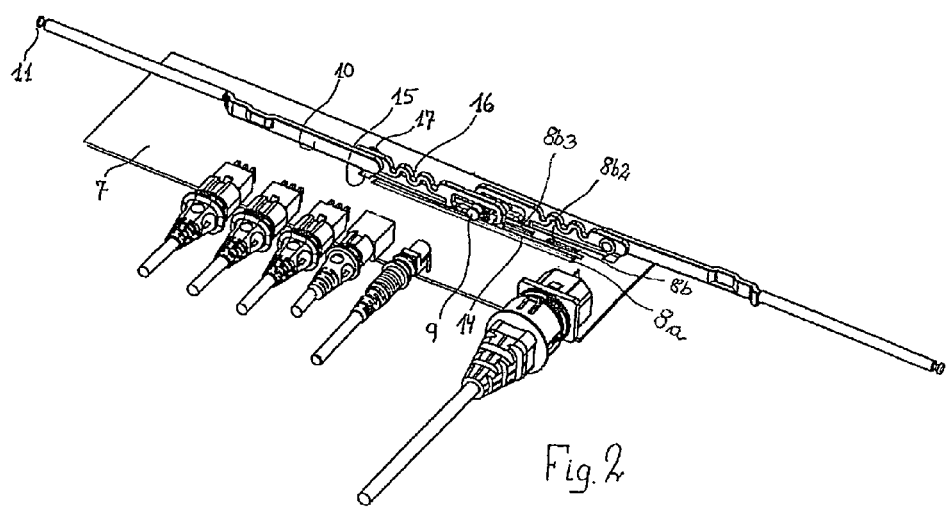
FIG. 2 shows the circuit board from the actuator in FIG. 1 on an enlarged scale.
Figure 3:
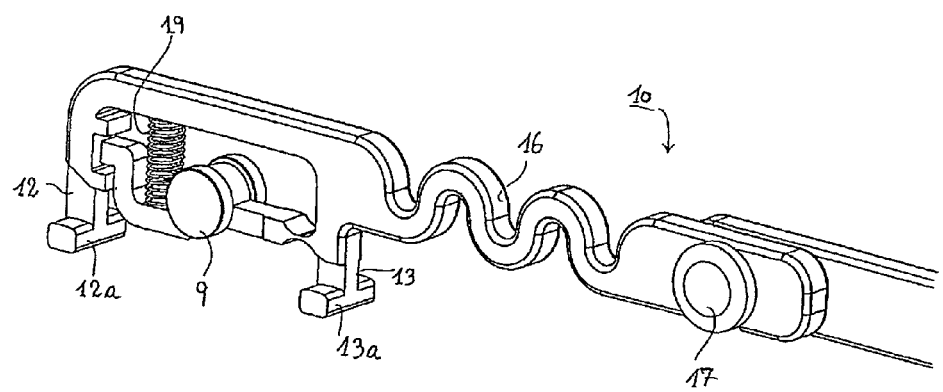
FIG. 3 shows the end of the connection rod connected to the circuit board on an enlarged scale.

The linear dual actuator shown in FIG. 1 is intended for adjustable beds, where a uniform drive unit is provided in each end of the actuator. These drive units comprise a spindle 1 driven by a low voltage DC motor 2 over a worm drive 3. A spindle nut 4 shaped as a square like sliding element is mounted on the spindle 1 and guided in the housing of the actuator 5, so that it is prevented from rotating, which causes it to slide back and forth on the spindle 1 depending on the direction of rotation of the spindle. In the middle of the housing 5 a power supply based on a toroidal transformer 6 and a control circuit board 7 is mounted.

The end-stops for the travel of the spindle nut is integrated into the circuit board 7, which have two parallel paths in the nature of printed conductors 8. Through a metal roller 9 mounted on the end of the connection rod 10 contact in pairs is created between these conductors 8. The metal roller 9 is mounted on an arm, which is pressed in contact with the conductors 8 by means of a coil spring 19. This rod is connected to the spindle nut 4 at the snap-locking of a pivot 11 at the end of the rod 10 in an aperture or slit in the spindle nut. The connection rod is equipped with two fins 12,13, which reach into a longitudinal groove 14 in the circuit board. The fins 12,13 project on the other side of the circuit board, where they are equipped with two transverse ribs 12a, 13a, sliding against the circuit board so that the rod is prevented from disengagement. At the end of the groove 14 the circuit board has a larger opening 15 for insertion of the fins 12,13 in the groove 14. The rod 10 has curves (meanders) 16, absorbing shocks and strokes and in that way prevents these from being transmitted to the circuit board. Furthermore, the rod has a hinge 17; so that it can be folded up during the shipment and handling. During the assembly process the rod 10 is unfolded and led through an aperture in a traverse wall 18 in the housing and is connected to the spindle nut 4.

As it appears the motor 2 is controlled by two relays K1A, K1B; K2A,K2B, where the relay coils K1B;K2B are connected to the two parallel electrically conducting paths 8. As it appears one of the paths 8a is uninterrupted while the other path 8b has two short pieces 8b1, 8b2 at each end of a longer intervening piece 8b3. When the spindle nut 4 moves, the roller 9 moves synchronous herewith on the electro-conductive paths 8a, 8b. When the spindle nut 4 reaches its outer position at the left in FIG. 1, the roller 9 simultaneously reaches the end of the paths 8a, 8b and contact between the short end piece 8b1 and the path 8 is closed, which causes the relay-actuated switch K1A to change position for cutting off the current to the motor 2. Similar events occur when the spindle nut 4 reaches the other end, i.e., at the right in the figures. Hereby the roller closes electric contact between the path 8a and the short end piece 8b2, which causes the relay-actuated switch K2A to change for cutting off the current to the motor 2. The end-stop is here described in connection with the drive in the left side of the actuator, but the end-stop in the right end of the actuator is built correspondingly.

As indicated in FIG. 5, the principle of the end-stop can be developed further into position detection. This is done by carrying out a sub division of the electro-conductive paths 8 into for instance nine shorter sub distances, and by additionally displacing the division, a doubling of the position determinations can be achieved. As it appears the roller 9 is still in contact with the sub path in one side when it leaves a piece of sub path in the other side. The change also indicates the change in the signal for the control detecting the new position. In the outer positions the last sub distances or "islands" still works as end-stops.

Thus, with the invention a new end-stop concept for single and dual actuators is created, which is advantageous in that it primarily is arranged on the control circuit board and in that way one single circuit board suffices. Thus the traditional end-stop switches arranged along the spindle are avoided. With that the assembly process is eased considerably. In the first development with two parallel electric paths on the circuit board and a sliding connection herewith, end-stop switches altogether can be avoided. In a further development of this a position detection of the spindle nut can be brought about in a relatively simple manner. Moreover, this position detection is absolute position detection, where the positions are not lost in case of power failure or manual adjustment. At the same time the construction provides a possibility for a controlling with a memory-function, where one or more positions may be saved in a memory and recalled through a push button for an automatic adjustment to a predetermined position for instance a certain sitting position accommodated to a certain user. Furthermore the invention provides basis for choosing between the above-mentioned solution, sliding potentiometer or ordinary switches with the same basic construction on the whole.

The invention claimed is:

1. A dual actuator which comprises:
an elongated housing having opposite first and second ends,
first and second linear actuator assemblies respectively located at said first and second ends of said housing, each of said first and second linear actuator assemblies comprising a motor, a spindle, a transmission connected between the motor and the spindle for rotating the spindle, and a spindle nut non-rotatably mounted on the spindle to move along the spindle with rotation of the spindle, the motors of said first and second linear actuator assemblies being located at opposite ends of said elongated housing and associated spindles extending from an associated transmission towards a center of said housing,
a circuit board positioned between the spindles of the first and second linear actuator assemblies, said circuit board including control electronics and switches for determination of a position of the spindle nut along the respective spindle of said first and second linear actuator assemblies, and
a first elongated connection element connected to a spindle nut of said first linear actuator assembly for movement with the spindle nut and for contact with a respective switch on said circuit board.

2. The dual actuator according to claim 1, including a second elongated connection element connected to a spindle nut of said second linear actuator assembly for movement therewith and for contact with a respective switch on said circuit board.

3. The dual actuator according to claim 2, wherein said switches comprises parallel conductor strips on said circuit board, and each of said first and second elongated connection elements includes a conductive element that spans said parallel conductor strips.

4. The dual actuator according to claim 3 wherein each conductive element comprises a metal roller.

5. The dual actuator according to claim 3, wherein one end of each of said elongated connection elements includes a fin which moves along a groove in said circuit board.

6. The dual actuator according to claim 3, wherein said parallel conductor strips include intermediate conductor patches for detection of various positions of said nuts along said spindles.

7. The dual actuator according to claim 3, wherein said first and second elongated connection elements include meandering shock-absorbing portions.

* * * * *